(12) United States Patent
Steiner

(10) Patent No.: US 10,980,368 B2
(45) Date of Patent: Apr. 20, 2021

(54) DEVICE FOR POURING OUT MILK FROTH, LIQUIDS OR THE LIKE

(71) Applicant: STEINER AG WEGGIS, Weggis (CH)

(72) Inventor: Adrian Steiner, Weggis (CH)

(73) Assignee: STEINER AG WEGGIS, Weggis (CH)

( * ) Notice: Subject to any disclaimer, the term of this patent is extended or adjusted under 35 U.S.C. 154(b) by 234 days.

(21) Appl. No.: 16/106,487

(22) Filed: Aug. 21, 2018

(65) Prior Publication Data

US 2019/0008314 A1 Jan. 10, 2019

Related U.S. Application Data

(63) Continuation-in-part of application No. 14/553,462, filed on Nov. 25, 2014, now abandoned.

(30) Foreign Application Priority Data

Nov. 29, 2013 (CH) ..................................... 01989/13

(51) Int. Cl.
  *A47J 31/44* (2006.01)
  *A23F 5/24* (2006.01)
(52) U.S. Cl.
  CPC ............. *A47J 31/4496* (2013.01); *A23F 5/24* (2013.01); *A47J 31/4485* (2013.01)
(58) Field of Classification Search
  None
  See application file for complete search history.

(56) References Cited

U.S. PATENT DOCUMENTS

| 4,681,028 A | 7/1987 | Schmed et al. |
| 4,852,472 A | 8/1989 | In-Albon et al. |
| (Continued) | | |

FOREIGN PATENT DOCUMENTS

| CA | 2102732 A1 | 5/2014 |
| CN | 105747859 A | 7/2016 |
| (Continued) | | |

OTHER PUBLICATIONS

Vlag et al., A Guide to Latte Art, Dec. 3, 2007, http://web.archive.org/web/20071203021532/http://coffeeinfo.wordpress.com/a-guide-to-latte-art-free-pour.

(Continued)

*Primary Examiner* — Tu B Hoang
*Assistant Examiner* — Masahiko Muranami
(74) *Attorney, Agent, or Firm* — Brian Roffe

(57) ABSTRACT

Coffee machine including a housing frame and device for generating coffee, and an integrated device for dispensing milk froth onto a coffee drink in a container. This device, possibly in the form of a robot, includes a dispenser controllable to enable automated movement in two or three coordinate directions, and dispenses the milk froth directly onto a surface of the coffee drink previously poured into the container. An automated movement mechanism controls movement of the dispenser during dispensing of the milk froth to cause automatic and controlled addition of a specific amount of the milk froth onto the coffee drink surface and produce an aesthetically decorative graphic pattern thereon. The specific amount of milk froth remains on and/or beneath the coffee drink surface. The coffee drink is poured into the container and the graphic pattern of milk forth is produced on the coffee drink surface by the same coffee machine.

20 Claims, 5 Drawing Sheets

(56) References Cited

U.S. PATENT DOCUMENTS

| | | | |
|---|---|---|---|
| 4,892,031 A | | 1/1990 | Webster et al. |
| 4,976,582 A | * | 12/1990 | Clavel .................... B25J 9/1065 |
| | | | 108/138 |
| 5,263,382 A | * | 11/1993 | Brooks ............... B25J 17/0266 |
| | | | 74/471 XY |
| 5,367,947 A | | 11/1994 | Lussi et al. |
| 5,931,080 A | | 8/1999 | Roure Boada |
| 5,957,033 A | | 9/1999 | In-Albon |
| 6,298,769 B1 | | 10/2001 | Stettes et al. |
| 6,713,110 B2 | | 3/2004 | Imoboden et al. |
| 6,838,110 B2 | | 1/2005 | Wragg et al. |
| 7,017,474 B2 | | 3/2006 | Comte |
| 7,472,641 B2 | | 1/2009 | Doglioni Majer |
| 7,475,628 B2 | | 1/2009 | Lussi |
| 7,509,907 B2 | | 3/2009 | Ozanne |
| 7,748,311 B2 | | 7/2010 | Brouwer et al. |
| 8,146,485 B2 | | 4/2012 | Ozanne et al. |
| 8,479,643 B2 | | 7/2013 | Aemisegger et al. |
| 8,590,443 B2 | | 11/2013 | Mahlich |
| 9,320,364 B2 | | 4/2016 | Remo et al. |
| 9,320,384 B2 | | 4/2016 | Remo et al. |
| 2004/0024385 A1 | | 2/2004 | Stuart |
| 2005/0157148 A1 | * | 7/2005 | Baker ....................... A23F 5/24 |
| | | | 347/106 |
| 2006/0236874 A1 | * | 10/2006 | Ozanne ............... A47J 31/4485 |
| | | | 99/452 |
| 2006/0286218 A1 | * | 12/2006 | Salzman ............ A23G 2220/00 |
| | | | 426/106 |
| 2007/0242561 A1 | * | 10/2007 | Agon .................. A47J 31/4482 |
| | | | 366/279 |
| 2009/0066100 A1 | | 3/2009 | Bosscher et al. |
| 2009/0074928 A1 | | 3/2009 | Pikalo |
| 2009/0158879 A1 | * | 6/2009 | Viola ........................ B66F 3/08 |
| | | | 74/490.08 |
| 2009/0202686 A1 | * | 8/2009 | Lavie ..................... B41M 3/006 |
| | | | 426/231 |
| 2009/0317519 A1 | * | 12/2009 | Lavie ........................ A23L 2/58 |
| | | | 426/87 |
| 2010/0011968 A1 | | 1/2010 | Fin et al. |
| 2011/0256289 A1 | | 10/2011 | Steiner |
| 2012/0171383 A1 | | 7/2012 | Christensen et al. |
| 2013/0103198 A1 | | 4/2013 | Nakamoto et al. |
| 2013/0276636 A1 | * | 10/2013 | Rithener ............. A47J 31/4403 |
| | | | 99/285 |
| 2014/0116475 A1 | | 5/2014 | Steiner |
| 2015/0327715 A1 | | 11/2015 | Steiner |

FOREIGN PATENT DOCUMENTS

| | | |
|---|---|---|
| EP | 1878544 A1 | 1/2008 |
| WO | 2011155575 A1 | 12/2011 |

OTHER PUBLICATIONS

Rostock, Sep. 30, 2012, www.youtube.com/watchv?9-YXZH8DSdQ.
3Ders, Jul. 14, 2012, www.3Ders.org/articles/120714-rostock-an-amazing-delta-robot-3d-printer-prototype.html.
https://www.youtube.com/watch?v=X3bXaZqu7w4&feature=youtu.be, "how to make a latte art heart-perfect coffee".
Abstract of CN 105747859.

* cited by examiner

US 10,980,368 B2

DEVICE FOR POURING OUT MILK FROTH, LIQUIDS OR THE LIKE

FIELD OF THE INVENTION

The invention relates to a method for pouring out milk froth, liquids or the like from a device wherein, after pouring out a drink, preferably coffee, into a container, a specific amount of milk froth or the like is added which remains on the surface of the drink, preferably coffee, that has been poured in, as well as to a device for implementing this method or a similar method.

BACKGROUND OF THE INVENTION

In the preparation of drinks, in particular coffee, widely known among experts by the name "latte type", milk froth is added to the coffee by hand from a jug or the like in such a way that a graphic pattern with figural or abstract motifs, that is determined by the creativity and skill of the person carrying out the task of pouring the milk froth from the jug, is produced on the coffee. This type of preparation is particularly time-consuming and requires a lot of practice until a person pouring out the milk froth can form such motifs in an aesthetically pleasing manner.

A coffee machine is often used to brew and dispense the coffee. From U.S. Pat. No. 5,957,033, incorporated by reference herein, FIG. 4 depicts a housing frame 10 of an exemplifying coffee machine, which comprises a support frame 12, a rear wall 11, several connector components described further in the following, as well as a cable channel 13 connecting them. The support frame 12 is open in the front, is fastened at the rear thereof the rear wall 11, and includes two outer lateral walls as well as a dividing wall 12' disposed therebetween. One outer wall and the dividing wall 12' are provided with horizontal guide ledges 15, 16. An intermediate bottom or shelf 17 is provided between dividing wall 12' and the other outer wall.

An extraction device 20 for generating the coffee, explained in detail in EP-B1 0 299 399 (which corresponds to U.S. Pat. No. 4,852,472 incorporated by reference herein, is fastened on a support plate or sheet 21 and comprises a piston/cylinder unit 25, two grinders 22, 23, a driving element or member 24 for grinding coffee beans as well as connector components 26, 27 positioned on the rear side of the support sheet 21 respectively establishing an electrical connection and a water connection with an inlet and an outlet of extraction device 20. A motor 24' drives a threaded spindle 28 varying a brewing cylinder 31. The piston/cylinder unit 25 includes brewing cylinder 31 that is open at the front and guided on guide rods 31' so as to be longitudinally displaceable and two pistons 32. One piston 32 is disposed stationarily at the open front face of the brewing cylinder 31 while the other piston 32 is movable via a defined stroke. The brewing cylinder 31 has two laterally opposed openings which correspond with respective particular grinders.

When generating coffee, the brewing cylinder 31 is brought by the driving element or member 24 into a position in which it forms a hollow space bounded by the pistons 32 into which, via one lateral opening, ground coffee is filled in a defined portion. By pulling along the movable piston 32, the brewing cylinder 31 subsequently moves toward the stationary piston 32. This decreases the hollow space up to a predetermined degree and the coffee portion disposed therein is compressed. In this position, boiling water is pumped through the one piston 32 into the hollow space and, consequently, through the portioned coffee, and subsequently the coffee generated therewith is transported through the other piston 32 to an outlet of the coffee machine. Thereupon the brewing cylinder 31 and, after a specific displacement, also the movable piston are shifted back and specifically until the latter reaches the open cylinder end and the stationary piston 32 has been moved out of the brewing cylinder 31. Thereby the consumed portion of coffee grounds is ejected and emptied into a collection container 45 disposed underneath brewing cylinder 31. The brewing cylinder 31 is subsequently moved back into the starting position.

An electronic control unit 40 with electronic elements 44", which are not explained in detail and forming a module, is placed in a drawer 42 with a handle 43 disposed at the front. On the rear wall, connector components 44 are provided. Control unit 40 is connected via a power switch with a power connection which is not shown in detail. With control unit 40, the entire coffee machine is controlled.

A hot-water and steam supply 50 is also disposed on a support sheet 51 as an additional independent module, see FIG. 5. It comprises a water pump 52 as well as a heatable water container 54 (boiler). Furthermore, an electric connector component 56 and a connector component 55 with inputs and outputs for a water connection on the rear side of the support sheet 51 are provided. The connector component 55 as well as also the connector component 27 of the extraction device 20 each include a valve, not shown, which causes the closing of through-openings provided in connector components 55, 27 when not plugged. This ensures that when this module is pulled out of the water potentially contained in the water container 54 does not flow out. The water pump 52 draws water from a line connected to the coffee machine and pumps it into the boiler and, after it is heated, either to the extraction device 20 or directly to an outlet on the coffee machine, by means of which hot water can be removed for tea or the like. For this purpose, an additional connector component 55" is provided on the front side of the water supply 50, which is coupled to an outlet cock 61 via a tube (FIGS. 6 and 7). Hot-water supply 50 is connected with a further outlet 52 for discharge of steam.

As a further independent module, a unit 30 is provided in the coffee machine for generating milk foam and has a connector component 33 on a rear side thereof. Otherwise, unit 30 is depicted only schematically, because the design and the functional operation thereof are known from EP-A1 0 600 826 (which corresponds to CA 2102732). Milk is filled into a container 35 provided with a cover milk is heated therein and suctioned via a suction line together with air from a separate air supply by a pump, is pressed through a resistance element and emptied in the thereby generated foamed state into an outlet chamber and subsequently into a coffee cup or the like. Unit 30 is therefore advisably connected with an outlet 60 on the front of the coffee machine by means of a tube, not shown in further detail. The modules explained above are slid independently of each other at respective positions into the housing frame 10. The extraction device 20 is pushed back on the guide ledges 16 until its two connector components 26, 27 are plugged into corresponding connector components 26', 27' on the rear wall 11. The module of the hot-water supply 50 is coupled below extraction device 20 with connector components 55', 56' at a position below extraction device 20, see FIG. 5.

Adjacent the module of the hot-water supply 50, control unit 40 is connector with connector component 44'. Above control unit 40, unit 30 is connected with connector component 33'. In front of the hot-water supply 50 is slid a collecting container 45 which is placed underneath the piston/cylinder unit 25, in order to be able to collect the coffee ground portions ejected by the piston/cylinder unit 25. In addition, preferably a microswitch is installed in the housing frame 10 and is switched on by the collecting container 45 in a slid-in state so that coffee is brewed only when container 45 is in this position. The connector components on the rear wall 11 of the housing frame 10 are connected to cables or tubes which are guided in the cable channel 13. Corresponding control commands are transmitted by the control unit 40 to the other modules.

With respect to the plane extending perpendicularly to the direction of plugging in, two connector components 26' and 56' are supported flatingly in the housing frame. They therefore do not need to be positioned precisely with respect to connector components 27', 55'. This ensures when plugging in the device 20 or the hot-water supply 50 that the particular two connector components 26, 27 or 56, 55 of such modules, which moreover are implemented conically at the front, can be centered and plugged in readily into the associated connector components.

The discrete modules are supported on support sheets 21, 51, drawers 42 or the like, each of which forms a bearing surface such that the components disposed thereon, such as for example the brewing cylinder 31, the grinders 22 and the motor 24 of the extraction device, can be attached essentially one next to the other forming a clearly laid-out configuration. In the event of a potential defect of the machine, the modules can be removed independently of one another simply and rapidly, and individual parts of the modules, such as for example a motor, can also be replaced without difficulty because of the clearly laid-out configuration of the modules.

FIGS. 6 and 7 show the assembled coffee machine in front view and in side view, respectively. After the modules are installed in the housing frame 10, the housing frame 10 is closed with a chassis and at the front with a housing cover 19 and a height-adjustable control panel 65. Thereby, the individual modules are secured against displacement. The control panel 65 disposed on the upper front side includes various pushbuttons 66 by means of which the machine can be operated as desired in conventional manner. The pushbuttons 66 are connected with the control unit 40 via a not-shown harness of cables and convey to it depending on the button depression a corresponding control command. Further, a display 67 is disposed on panel 65 and always displays to the user the current function, for example "coffee ready". Through the height-adjustable outlet head 60, the coffee made by the extraction device 20 can be discharged into a cup placed therebeneath and, with a corresponding selection, the milk foam generated by unit 30, also can be discharged. In addition, outlet cocks 61 and 62 are provided for removing hot water or water steam. Further, underneath these cocks is disposed a pedestal 63, preferably with a removable collection basin, for drain of potential residual coffee or water.

The control panel 65 extending over the entire length of the housing frame 10 can be shifted upwardly via guide rods, not shown, and guided longitudinally in the housing frame 10, to a position 65' indicated in dot-dash lines so that the modules, specifically the extraction device 20 as well as unit 30, can be slid in or removed from the front. Panel 65 advantageously can be arrested in the depicted operating or assembly positions 65' via means not shown.

FIG. 7 also shows the slid-in modules in thinner dot-dash lines. In the upper half of the coffee machine is disposed the extraction device 20. Above the grinder 22 is placed a supply of beaker 68 into which coffee beans can be filled. The grinder 22 is driven via a toothed belt 29 or the like by motor 24. Furthermore, shown are pistons 32 and 32' which close the cylinder 31 in the position shown.

OBJECTS AND SUMMARY OF THE INVENTION

It is an object of the invention to devise a method of the type specified at the start by means of which it is possible to prepare coffee and similar products en masse in a time-saving manner, and a device for implementing this and similar methods.

According to the invention, this object is achieved by the milk froth being added while the drink is being poured out in such a way that the milk froth produces a graphic pattern on the surface of the poured in drink.

In this way, largely consistent milk froth patterns can be produced in a relatively short time according to motifs that can be selected in advance independently of the technical skill of the user. This makes it possible to produce coffee of the "latte type" en masse with qualitatively impeccable milk froth patterns.

This invention also makes provision such that the device by means of which the coffee milk froth is added is controlled in three coordinate directions preferably aligned equiangularly to one another. According to this procedure, the coffee can be provided with relief-like milk froth patterns.

The invention also makes provision such that the control of the device adding the milk froth can be programmed, the user being able to select, for example, his/her preferred milk froth pattern from a plurality of motifs.

The device for implementing the method according to the invention is equipped with individually operable articulated arms for guiding a milk froth dispenser in a respective coordinate direction.

In the illustrated embodiment, the device, as a robot, is equipped with individually controlled rotary drives which are arranged in an equiangular triangle and are provided with operating levers for operating the articulated arms.

For holding the coffee and the milk froth, coffee cups or similar containers are generally used, the dimensions of which are not standardized and the position of which relative to the milk froth dispenser varies within specific limits. For this reason, the invention also makes provision such that the device for implementing the method according to the invention is provided with sensors for recognizing the height of the cup and the position of the cup.

So that the user is protected from the moving parts of the device, the device can be provided with a safety system. The safety system can have a light grid or a light curtain that halts operation as soon as a foreign body interrupts it. The safety system can also include a protective hood by means of which the device is screened during the preparation process.

The device according to the invention is designed such that it can be fully integrated into a conventional coffee machine. However, it is also possible to design the device as a self-contained module. In the former situation, the coffee machine includes, like the one disclosed in U.S. Pat. No. 5,957,033, a housing frame, a device for generating coffee, and an integrated device for dispensing milk froth onto a coffee drink in a container, which integrated device includes a dispenser controllable spatially to enable automated movement in two or three coordinate directions and which includes a discharge port through which the milk froth is dispensed from the dispenser directly onto a surface of the coffee drink that has been previously poured into the container by the coffee machine. The integrated device also includes an automated movement mechanism that controls movement of the dispenser in the two or three directions during dispensing of the milk froth from the dispenser to cause automatic and controlled addition of a specific amount of the milk froth from the dispenser onto the surface of the coffee drink that has been previously poured into the container by the coffee machine and produce a graphic pattern on the surface of the coffee drink. The specific amount of milk froth remains on and/or beneath the surface of the coffee drink. As such, the coffee drink is poured into the container and the graphic pattern of milk froth is produced in the surface of the coffee drink by the same coffee machine.

Another embodiment of a coffee machine includes a housing frame, a device for generating coffee, like the one disclosed in U.S. Pat. No. 5,957,033, and an integrated device for dispensing milk froth onto a coffee drink in a container.

This integrated device includes a dispenser controllable spatially to enable automated movement in two or three coordinate directions, and which dispenser includes a discharge port through which the milk froth is dispensed from the dispenser directly onto a surface of the coffee drink that has been previously poured into the container by the coffee machine. The integrated device also includes an automated movement mechanism that controls movement of the dispenser in the two or three directions during dispensing of the milk froth from the dispenser to cause automatic and controlled addition of a specific amount of the milk froth from the dispenser onto the surface of the coffee drink that has been previously poured into the container by the coffee machine and produce a graphic pattern on the surface of the coffee drink. The specific amount of milk froth remains on and/or beneath the surface of the coffee drink. The movement mechanism includes a plurality of articulated arms and a plurality of linear motors that each cause movement in a linear direction. Each of the articulated arms is moved by the movement mechanism. A carrier plate is connected flexibly to the articulated arms and holds the dispenser such that movement of the articulated arms cause movement of the carrier plate and the dispenser being moved as a result of movement of the carrier plate. The articulated arms are situated on different sides of the carrier plate. The movement mechanism is connected to the carrier plate to move the carrier plate. The coffee drink is poured into the container and the graphic pattern of milk froth is produced in the surface of the coffee drink by the same coffee machine.

BRIEF DESCRIPTION OF THE DRAWINGS

The invention is described in more detail below by means of an exemplary embodiment with reference to the drawings. These show as follows.

DETAILED DESCRIPTION OF THE INVENTION

Figure 1:
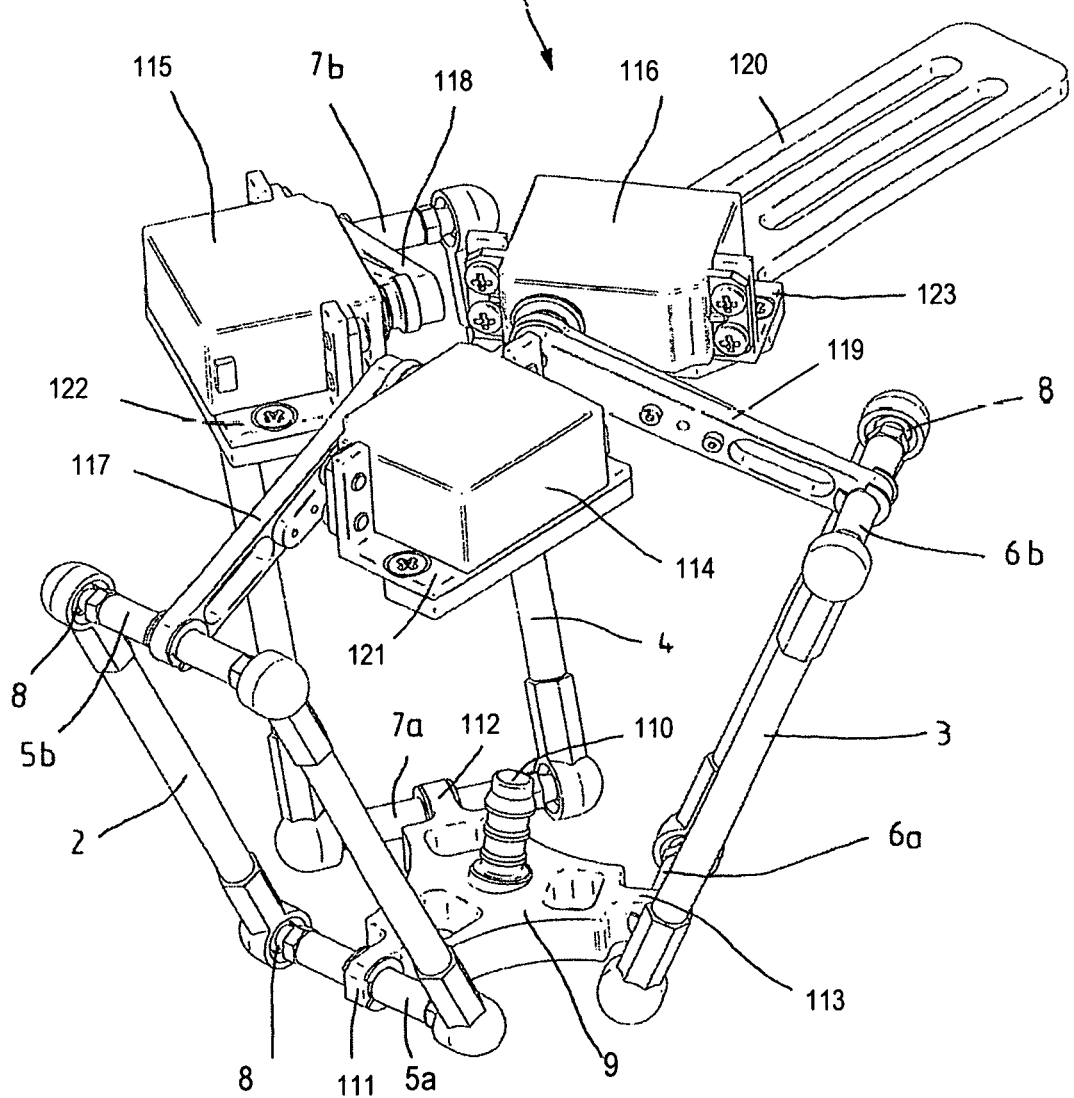
FIG. 1 is a device according to the invention in a perspective diagrammatic view.

FIG. 1 shows a device 1 for a method wherein, after pouring out a drink, a specific amount of milk froth or the like, which remains on and/or beneath the surface of the poured out drink, is added to a container. Under normal circumstances, for example, the milk froth poured in mixes with the coffee in the surface region of the latter, and part of the milk froth remains above this surface.

A suitable drink is preferably coffee for the production of a cappuccino. However, it can also be hot or cold chocolate, milk or some other mixed drink. Instead of milk froth, a different froth or cream-like medium could also be poured on.

According to the invention the milk froth or the like is added in a controlled manner during pouring such that a graphic pattern is produced on the surface of the poured out drink by this froth.

By this method one can produce the form of a heart, a flower, a plant, a face, a company logo or any motif as the graphic pattern.

Figure 2:
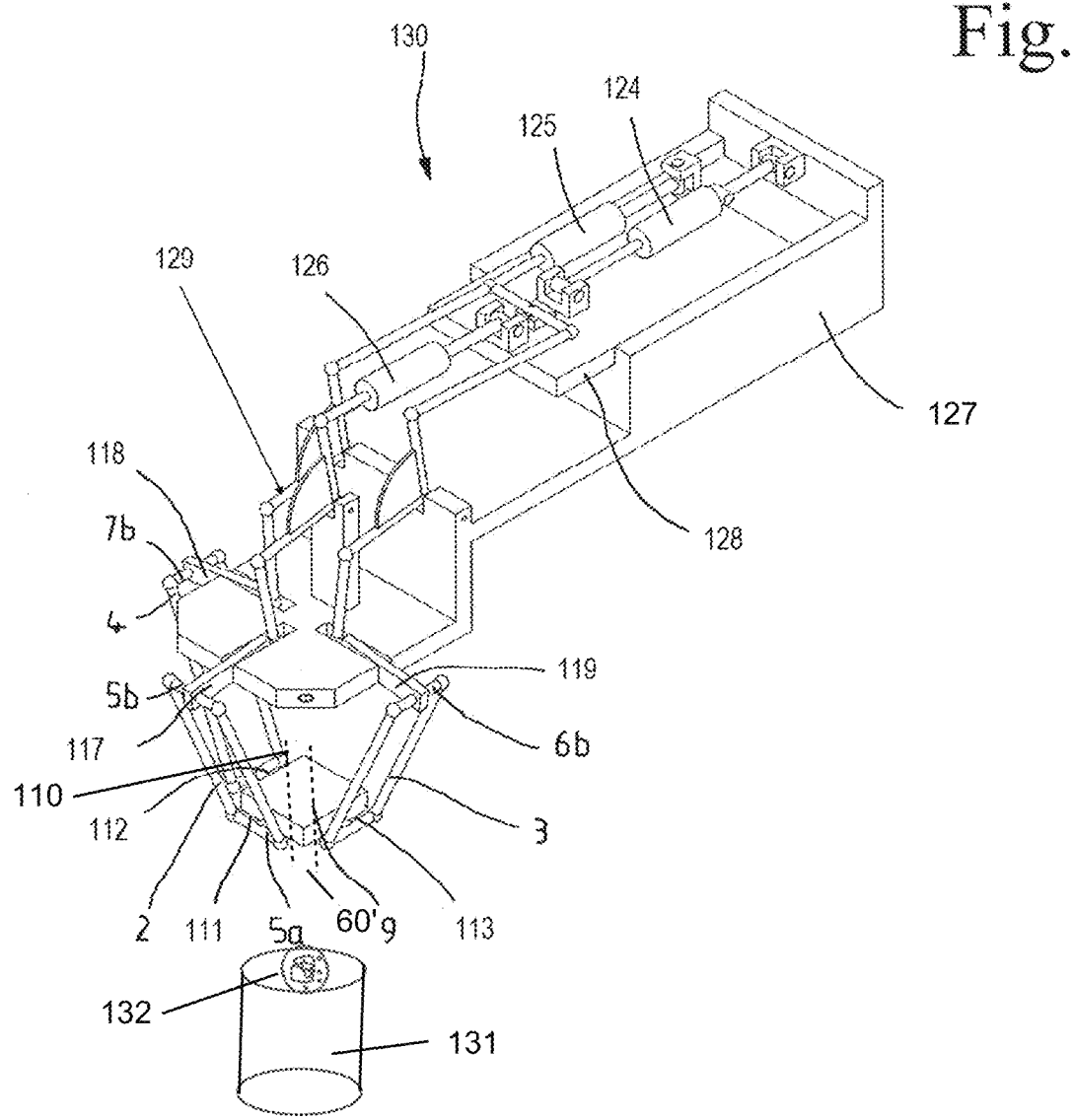
FIG. 2 is a perspective view of a second embodiment of a device according to the invention with linear motors as drive means.

The device 1 according to the invention basically consists of three articulated arms 2, 3, 4 that can be moved individually by means of rotary drives 114, 115, 116, a carrier plate 9 connected flexibly to the articulated arms 2, 3, 4 and a discharge port 60' connected to a milk froth dispenser 110 (see FIG. 2). As shown in FIG. 1, the dispenser 110 engages with the carrier plate 9 and is held by the carrier plate 9 such that movement of the carrier plate caused by movement of the articulated arms 2, 3, 4 causes movement of the dispenser 110. The members of the articulated arms 2, 3, 4 are connected in pairs by cross members 5a, 5b; 6a, 6b and 7a, 7b to ball joints 8 which guarantee the agility of the articulated arms 2, 3, 4 on all sides. This carrier plate 9 is held on the lower cross members 5a, 6a, 7a of the articulated arms 2, 3, 4. These three suspension bearings 111, 112, 113 form the corners of an equiangular triangle. This device 1 is made in the form of a robot here and is operated by program/programmable control.

The articulated arms 2, 3, 4 are operated by means of rotary drives 114, 115, 116 using operating levers 117, 118, 119 which act on the upper cross members 5b, 6b, 7b of the articulated arms 2, 3, 4. The rotary drives 114, 115, 116 are controlled according to one or more specified programs such that each articulated arm 2, 3, 4 is moved in any coordinate direction. In the present exemplary embodiment, these directions are arranged at angles of 120° in relation to one another. The corresponding arrangement is also produced for the rotary drives 114, 115, 116 on the supporting frame, of which only the carrier plate 120 and the three motor carriers 121, 122, 123 can be seen in FIG. 1.

During the preparation procedure, the articulated arms 2, 3, 4 are moved by the rotary drives 114, 115, 116 such that they can guide the discharge port of the dispenser 110 for the milk froth precisely over the surface of the drink to be decorated according to the geometry of the respectively selected milk froth pattern. The corresponding control is advantageously a component part of a self-contained device-specific software. The programming also includes the selectability of the pattern from a plurality of programmed motifs, each motif may be the subject of a respective program or one program can be provided and enable multiple motifs.

Thus, there may be a singular program that provides multiple motifs, although use of multiple and repeatably executable programs, each providing a single or multiple motifs can also be provided at the discretion of the device fabrictor. Any program may be executed a plurality of times to effect movement of one or more driver each time the program is executed. Also, each program may be executed to control the movement of the at least one of the drives.

The device 1 according to the invention is characterized in that it is stable and robust and guarantees the required operational safety when operated continuously. The device enables precise and sensitive guidance of the jet of milk.

A device 130 according to FIG. 2 substantially differs from that according to FIG. 1 in that it is provided with linear motors 124, 125, 126, i.e., motors that generate movement in a linear direction. instead of the rotary drives 114, 115, 116. The linear motors 124, 125, 126 are arranged parallel to one another within a housing 127, only part of which is shown, with a linear carriage 128 that moves in a linear direction. The linear carriage 128 can be moved to and fro in a linear direction by the linear motor 124, while the two other linear motors 125, 126 are mounted on the linear carriage 128 and move when the linear carriage 128 moves as a result of the operation of linear motor 124, and by means of an additional articulation system 129, the articulated arms 2, 3, 4 can move in the direction of coordinates x, y, z. Linear motor 125 is connected to articulated arms 3, 4 opposite one another while linear motor 126 is connected only to articulated arm 2 between the articulated arms 3, 4. The operating lever 117, 118, 119 and the suspension bearing 111, 112, 113 of the carrier plate 9 are arranged at right angles to one another for the milk froth dispenser.

In this embodiment, the carrier plate 9 and the milk froth dispenser 110 may be positioned at least partly outside of the coffee machine, or even possibly entirely outside of the coffee machine. The embodiment of FIG. 2 enables an easier integration of the device 130 into the coffee machine.

The movement sequence of the jet of milk froth during the automatic generation of a two-dimensional milk froth pattern takes place in the x and the y direction on the surface of the poured out drink. This movement sequence during the automatic generation of the milk froth pattern may be effected through control of the device, i.e., there is no manual movement of the device or any part thereof (the only manual action in some claimed embodiments being initiation of the automated movement of the device or parts thereof via, e.g., selection of a motif or program that initiates the automated physical movement of components of the device). Thus, the automated movement is in accordance with a (computer) program that is programmed to control the rotary drives 114, 115, 116 or linear motors 124, 125, 126 to effect the desired movement of the dispenser 110 in one or more of the two or three directions in which the device is movable. Use of software to effect movement of the device via, for example, control of the rotary drives 114, 115, 116 or linear motors, 124, 125, 126 is disclosed elsewhere herein.

Used as the basis normally is a coffee cup with an outside diameter of for example 80 mm which, in comparison to the diameter of the outlet opening at the discharge port of the dispenser 110, is advantageously a number of times greater so that this motif can be produced with the required accuracy. The starting position of the jet of milk froth is for example approximately 30 mm away from the zero point in the y axis. In the subsequent pouring out phase a movement of the jet of milk froth of (on average) approximately 25 mm back in the y axis and lateral swivel movements of approximately 20 mm in the x axis take place.

Additionally, a superordinate or a subsequent movement in z direction can be provided, which enables such a three dimensional figure. These movements are accordingly respectively specified for the chosen patterns.

These devices according to the invention can either be fully integrated into a coffee machine or be made in the form of a self-contained module.

Figure 3:
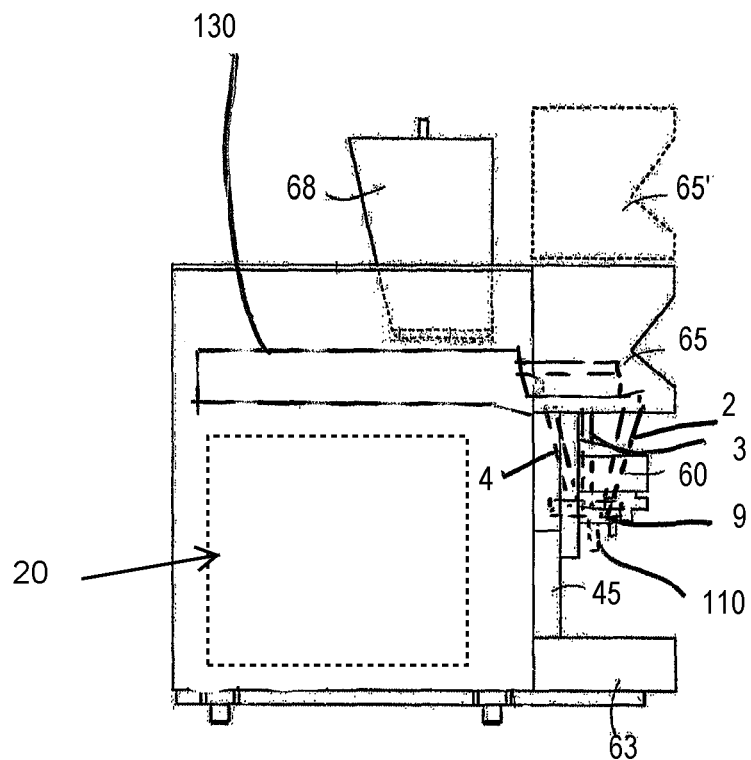
FIG. 3 is a side view of the coffee machine shown in FIG. 6 with the device in accordance with the invention.
Figure 4:
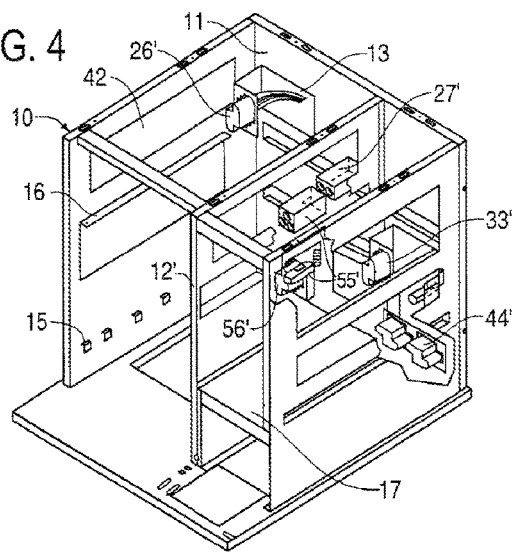
FIG. 4 is a schematic perspective representation of the housing frame of a prior art coffee machine.
Figure 5:
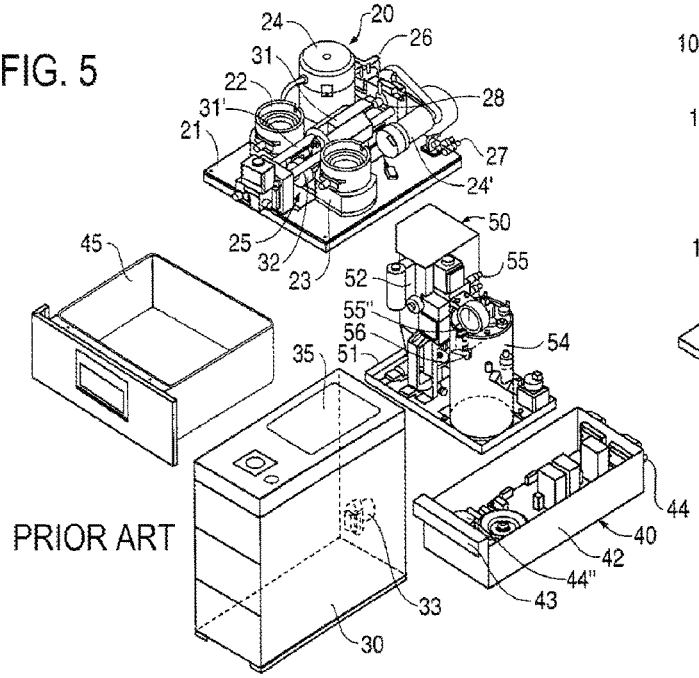
FIG. 5 is a schematic view of discrete modules slidable into the housing frame of the coffee machine of FIG. 4.
Figure 6:
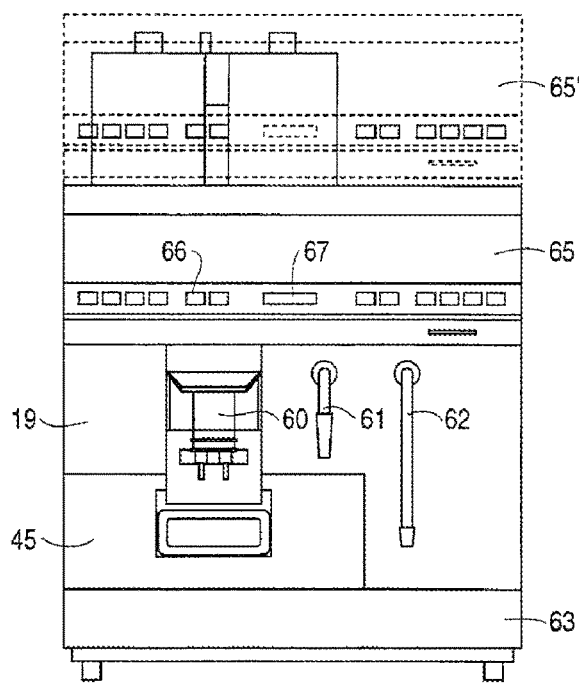
FIG. 6 is a view of the front of the prior art coffee machine shown in FIG. 4.
Figure 7:
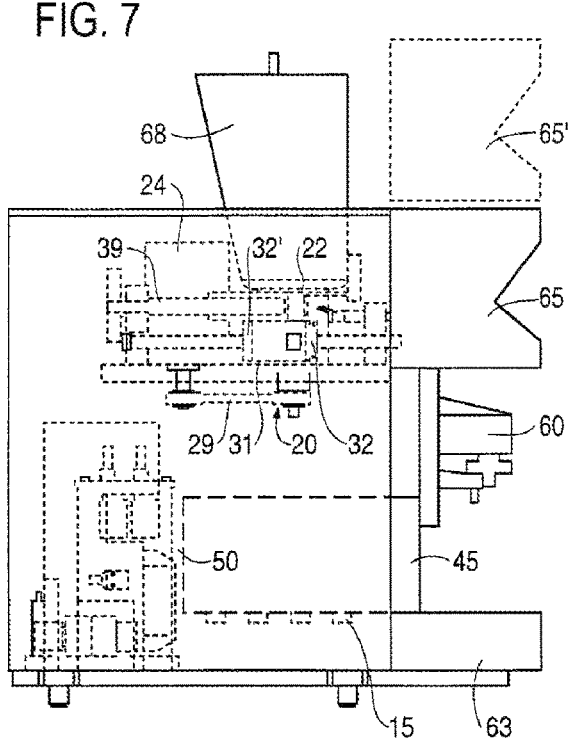
FIG. 7 is a side view of the prior art coffee machine shown in FIG. 4.

In the fully integrated state of the milk froth pouring or dispensing device, shown in FIG. 3 when integrated into the prior art coffee machine shown in FIGS. 4-7 from U.S. Pat. No. 5,957,033, the outlet of the dispenser 110 is naturally positioned above the area into which the container into which the milk froth will be poured is intended to be placed during dispensing of the milk froth from dispenser 110. The coffee generating device 20 is shown schematically. The articulated arms 2, 3, 4 may be situated within the housing of the coffee machine, and thus only partly visible or entirely concealed. The device 130 may slidably inserted into the housing frame 10 of the coffee machine, like milk foam generating unit 30 (and also device 1 could similarly be slidably inserted).

With reference to the coffee machine disclosed in U.S. Pat. No. 5,957,033, the dispenser 110 could also be arranged in connection with the outlet head 60 through which coffee is dispensed, as a substitute for the unit 30 that generates milk foam. That is, the milk froth generating device 1 or 130 can be arranged so that the carrier plate 9 and the dispenser 110 passing through the carrier plate 9 as clearly seen in FIG. 1 is able to cause the dispensing of milk froth in the desired pattern immediately after the coffee is dispensed into the container, and without moving the container after the coffee has been dispensed. There is thus a single outlet region for both coffee and milk froth. The coffee machine of U.S. Pat. No. 5,957,033 is described and illustrated only as an example of a coffee machine into which the device 1 or 130 can be integrated. Generally, such integration into a coffee machine means that the mechanism for pouring coffee or other beverage, and the mechanism for pouring the milk froth are in a common housing and ideally above the same area into which the container is being placed to receive the coffee and milk froth. In a different coffee machine, the dispenser 110 could be arranged in the outlet portion of the coffee machine through which the coffee is dispensed. Note that the coffee machine of U.S. Pat. No. 5,957,033 is an example of a machine for dispensing coffee, but other machines for dispensing chocolate or other beverages into which milk froth or other liquids to form a patterned design may be used in the invention.

Integration of the device for pouring or dispensing milk froth into a coffee machine, or even more so, the full integration of the device into a coffee machine, means that the device in which the dispenser is mounted is in the same machine that pours the coffee drink (i.e., integration being used to indicate insertion or immersion in). As mentioned above, the device according to the invention is designed such that it can be fully integrated into a conventional coffee machine. Integration of the device into a coffee machine differs from integration of the device with a coffee machine, which may simply means that both devices are in the same store and used together. Among other things, such full integration means that the machine operator is able to fill the coffee container and then pour the milk froth with a minimum of movement since, the device 1 or 130 may be configured to dispense milk froth into the same area as the coffee is dispensed. A platform may be provided onto which the container is placed into a rest state, see FIG. 6, and then the coffee is first dispensed into the container and then, without moving the container with coffee from the platform, the milk froth is dispensed while forming a desired pattern as disclosed herein.

Indeed, an important advantage of integration of the milk froth or cream medium dispensing device into the machine that pours out the coffee or chocolate is that the container can be filled with a desired amount of coffee or chocolate and thereafter the milk froth or cream medium having the design without moving the container, thereby eliminating the potential for spillage and reducing preparation time. As such, the entire process of obtaining a container of coffee or chocolate with a milk froth or cream medium in a design thereon can be done very fast and efficiently, so that the coffee is still hot and the milk froth is still fully in the consistency in which it is intended to be consumed.

The invention is sufficiently displayed by the exemplary embodiments described above. However, it could of course also be illustrated by other variations. Thus, for example, an outlet opening for the milk froth that is made to be elongate or differently shaped rather than with an approximately round cross section could be provided so that a pattern would also form on the surface of the drink.

In principle, the milk froth or the like could be poured out by being interrupted and then being displaced in two or three coordinate directions (x, y, z) along the surface of the poured in drink.

Disclosed above is therefore a coffee machine including a housing frame 10 and a device for generating coffee 20, with an integrated device for dispensing milk froth onto a coffee drink in a container 131 (see FIGS. 2 and 3). This milk froth dispensing device 1 or 130 includes a dispenser 110 controllable spatially to enable automated movement in two or three coordinate directions, and which has a discharge port 60' through which the milk froth is dispensed from the dispenser 110 directly onto a surface of the coffee drink that has been previously poured into the container 131 by the coffee machine. An automated movement mechanism, e.g., the articulated arms 2, 3, 4 and the structure that causes movement of the articulated arms 2, 3, 4, controls movement of the dispenser 110 in the two or three directions during dispensing of the milk froth from the dispenser 110 to cause automatic and controlled addition of a specific amount of the milk froth from the dispenser 110 onto the surface of the coffee drink that has been previously poured into the container 131 by the coffee machine and produce a graphic pattern 132 on the surface of the coffee drink (see FIG. 3). This specific amount of milk froth remains on and/or beneath the surface of the coffee drink. As such, the coffee drink is poured into the container and the graphic pattern of milk froth is produced in the surface of the coffee drink by the same coffee machine.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and is not limiting. The invention is limited only as defined in the claims and equivalents thereto.

The invention claimed is:

1. In a coffee machine including a housing frame and a device for generating coffee, the coffee machine further comprising:
   an integrated device for dispensing milk froth onto a coffee drink in a container, said integrated device comprising:
      a dispenser including a discharge port through which the milk froth is dispensed from said dispenser directly onto a surface of the coffee drink that has been previously poured into the container by the coffee machine;
      a carrier plate holding said dispenser; and
      an automated movement mechanism that controls automated movement of said dispenser in two or three coordinate directions by moving said carrier plate which causes movement of said dispenser held by said carrier plate to cause, during dispensing of the milk froth from said dispenser, automatic and controlled addition of a specific amount of the milk froth from said dispenser onto the surface of the coffee drink that has been previously poured into the container by the coffee machine and produce a graphic pattern of milk froth on the surface of the coffee drink,
   said movement mechanism comprising:
      three articulated arms, said carrier plate being connected flexibly to said three articulated arms;
      three operating levers each connected to a respective one of said three articulated arms and being movable to cause movement of the respective one of said three articulated arms connected thereto;
      three linear motors that each cause movement in a linear direction;
      an articulation system that couples said three linear motors to all of said three operating levers to convert movement in the linear direction provided by said three linear motors into movement of said three operating levers and movement of said three articulated arms connected to said three operating levers and then movement of said carrier plate, said dispenser being moved as a result of movement of said carrier plate; and
      a device housing in which said three linear motors are arranged parallel to one another,
   whereby the coffee drink is poured into the container and the graphic pattern of milk froth is produced in the surface of the coffee drink by the coffee machine.

2. The coffee machine of claim 1, wherein said movement mechanism further comprises a linear carriage, a first one of said linear motors moving said linear carriage, a second one of said linear motors and a third one of said linear motors being coupled to said linear carriage and moving upon movement of said linear carriage caused by said first one of said linear motors.

3. The coffee machine of claim 2, wherein said articulation system connects said second and third linear motors to all of said three operating levers.

4. The coffee machine of claim 2, wherein said articulation system connects said second linear motor to two of said three articulated arms connected to said carrier plate opposite one another and connects said third linear motor to another one of said three articulated arms between said two of said three articulated arms.

5. The coffee machine of claim 1, wherein said three articulated arms are situated on different sides of said carrier plate.

6. The coffee machine of claim 1, further comprising suspension bearings that each connect said carrier plate to a respective one of said three articulated arms.

7. The coffee machine of claim 1, wherein each of said three articulated arms comprises a pair of members and cross members linking said pair of members and that are spaced apart from one another.

8. The coffee machine of claim 7, wherein said carrier plate is connected to a lower one of said cross members of each of said three articulated arms.

9. The coffee machine of claim 7, wherein each of said three operating levers is connected to an upper one of said cross members of a respective one of said three articulated arms.

10. The coffee machine of claim 1, wherein said three operating levers are perpendicular to one another.

11. The coffee machine of claim 1, wherein each of said three operating levers is elongate and connected at one end region to the respective one of said three articulated arms and at an opposite end region to said articulation system.

12. The coffee machine of claim 1, wherein at least two of said three operating levers are perpendicular to one another.

13. In a coffee machine including a housing frame and a device for generating coffee, the coffee machine further comprising:
   an integrated device for dispensing milk froth onto a coffee drink in a container, said integrated device comprising:
      a dispenser including a discharge port through which the milk froth is dispensed from said dispenser directly onto a surface of the coffee drink that has been previously poured into the container by the coffee machine;
      an automated movement mechanism that controls automated movement of said dispenser in two or three coordinate directions during dispensing of the milk froth from said dispenser to cause automatic and controlled addition of a specific amount of the milk froth from said dispenser onto the surface of the coffee drink that has been previously poured into the container by the coffee machine and produce a graphic pattern of milk froth on the surface of the coffee drink,
      said movement mechanism comprising:
         three articulated arms;
         three operating levers each connected to a respective one of said three articulated arms and being movable to cause movement of the respective one of said three articulated arms connected thereto; and
         three linear motors that each cause movement of a rod in a linear direction; and
         an articulation system that couples said three linear motors to all of said three operating levers to convert movement in the linear direction provided by said three linear motors into movement of said three operating levers and movement of said three articulated arms connected to said three operating levers; and
      a carrier plate connected flexibly to all of said three articulated arms and holding said dispenser such that movement of any of said three articulated arms causes movement of said carrier plate and said dispenser being moved as a result of movement of said carrier plate, said articulated arms being situated on different sides of said carrier plate,
   whereby the coffee drink is poured into the container and the graphic pattern of milk froth is produced in the surface of the coffee drink by the coffee machine.

14. The coffee machine of claim 13, wherein said movement mechanism further comprises a linear carriage, a first one of said linear motors moving said linear carriage, a second one of said linear motors and a third one of said linear motors being coupled to said linear carriage and moving upon movement of said linear carriage caused by said first one of said linear motors.

15. The coffee machine of claim 13, wherein said articulation system connects said second and third linear motors to all of said three operating levers.

16. The coffee machine of claim 13, wherein said articulation system connects said second linear motor to two of said three articulated arms connected to said carrier plate opposite one another and connects said third linear motor to another one of said three articulated arms between said two of said three articulated arms.

17. The coffee machine of claim 13, wherein said three articulated arms are situated on different sides of said carrier plate.

18. The coffee machine of claim 13, wherein each of said three articulated arms comprises a pair of members and cross members linking said pair of members and that are spaced apart from one another, said carrier plate is connected to a lower one of said cross members of each of said three articulated arms and each of said three operating levers is connected to an upper one of said cross members of a respective one of said three articulated arms.

19. The coffee machine of claim 13, further comprising a device housing in which said three linear motors are arranged parallel to one another.

20. The coffee machine of claim 13, wherein each of said three operating levers is elongate and connected at one end region to the respective one of said three articulated arms and at an opposite end region to said articulation system.

* * * * *